US008983397B2

(12) United States Patent
Gorokhov

(10) Patent No.: US 8,983,397 B2
(45) Date of Patent: *Mar. 17, 2015

(54) METHOD AND APPARATUS FOR CHANNEL FEEDBACK BY MULTIPLE DESCRIPTION CODING IN A WIRELESS COMMUNICATION SYSTEM

(75) Inventor: Alexei Y. Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1227 days.

This patent is subject to a terminal disclaimer.

(21) Appl. No.: 12/348,827

(22) Filed: Jan. 5, 2009

(65) Prior Publication Data

US 2010/0091892 A1   Apr. 15, 2010

Related U.S. Application Data

(60) Provisional application No. 61/104,465, filed on Oct. 10, 2008.

(51) Int. Cl.
*H04B 1/00* (2006.01)
*H04B 7/00* (2006.01)
(Continued)

(52) U.S. Cl.
CPC .......... *H04L 1/0026* (2013.01); *H04L 1/0027* (2013.01); *H04L 1/0073* (2013.01); *H04B 7/0478* (2013.01)
USPC ........................................ 455/69

(58) Field of Classification Search
CPC .................................... H04B 7/0478
USPC ........................................ 455/69
See application file for complete search history.

(56) References Cited

U.S. PATENT DOCUMENTS 6,823,018 B1   11/2004   Jafarkhani et al.
6,983,243 B1   1/2006   Goyal et al.
(Continued)

FOREIGN PATENT DOCUMENTS

CN   1675858 A   9/2005
EP   1076425 A2   2/2001
(Continued)

OTHER PUBLICATIONS

"Comparison of Channel Quality Reporting Schemes" 3GPP TSG RAN WG1 Meeting#23, XX, XX, No. R1-02-0152, Jan. 8, 2002, pp. 1-5, XP002353929 the whole document.
(Continued)

*Primary Examiner* — Wesley Kim
*Assistant Examiner* — Devan Sandiford
(74) *Attorney, Agent, or Firm* — Liem T. Do

(57) ABSTRACT

A communication system comprises evolved base nodes (eNBs) communicating via an over-the-air (OTA) link with low mobility user equipment (UE). A network can utilize the eNBs for cooperative beam shaping for interference nulling based upon a number of factors UE (e.g., coordinated multipoint (CoMP) optimization for feedback, quality of service (QoS), fairness, etc.). The UE advantageously transmits multiple description coding (MDC) that supports a determination by the eNBs that coherent channel conditions (e.g., frequency and/or time invariance) exists for combining feedback reports to realize reduced quantization error. In addition, the MDC feedback reports still support incoherent channel states in which each report can be used individually for interference nulling/beamforming. MDC can be performed with one codebook or a plurality of codebooks.

27 Claims, 15 Drawing Sheets

(51) Int. Cl.
*H04L 1/00* (2006.01)
*H04B 7/04* (2006.01)

(56) References Cited

U.S. PATENT DOCUMENTS

| | | | |
|---|---|---|---|
| 8,194,762 B2 | 6/2012 | Mondal et al. | |
| 2004/0102968 A1 | 5/2004 | Tian et al. | |
| 2005/0032521 A1* | 2/2005 | Lee et al. | 455/450 |
| 2006/0039318 A1* | 2/2006 | Oh et al. | 370/328 |
| 2006/0165188 A1* | 7/2006 | Wunder et al. | 375/260 |
| 2007/0025427 A1 | 2/2007 | Jou | |
| 2007/0070956 A1 | 3/2007 | Seki | |
| 2007/0091815 A1 | 4/2007 | Tinnakornsrisuphap et al. | |
| 2007/0224995 A1* | 9/2007 | Frederiksen et al. | 455/437 |
| 2007/0297529 A1* | 12/2007 | Zhou et al. | 375/267 |
| 2008/0025267 A1* | 1/2008 | Wei et al. | 370/337 |
| 2008/0026744 A1* | 1/2008 | Frederiksen et al. | 455/425 |
| 2008/0037669 A1* | 2/2008 | Pan et al. | 375/260 |
| 2008/0057865 A1 | 3/2008 | Bennett | |
| 2008/0095258 A1 | 4/2008 | She et al. | |
| 2008/0132173 A1* | 6/2008 | Sung et al. | 455/67.13 |
| 2008/0165875 A1* | 7/2008 | Mundarath et al. | 375/262 |
| 2008/0219447 A1* | 9/2008 | McLaughlin | 380/270 |
| 2008/0232503 A1* | 9/2008 | Kim | 375/267 |
| 2008/0233945 A1* | 9/2008 | Gummadi et al. | 455/422.1 |
| 2008/0299917 A1* | 12/2008 | Alexiou et al. | 455/103 |
| 2009/0004986 A1* | 1/2009 | Park et al. | 455/226.3 |
| 2009/0046569 A1* | 2/2009 | Chen et al. | 370/203 |
| 2009/0066577 A1* | 3/2009 | Kim et al. | 342/373 |
| 2009/0131066 A1 | 5/2009 | Barve et al. | |
| 2009/0179797 A1* | 7/2009 | Kwon et al. | 342/368 |
| 2009/0279624 A1 | 11/2009 | Chen et al. | |
| 2010/0034135 A1 | 2/2010 | Kim et al. | |
| 2010/0091893 A1 | 4/2010 | Gorokhov | |
| 2010/0093287 A1 | 4/2010 | Higuchi et al. | |
| 2010/0128877 A1 | 5/2010 | Bloch et al. | |
| 2010/0172256 A1* | 7/2010 | Mallik et al. | 370/252 |
| 2012/0069759 A1 | 3/2012 | Gummadi et al. | |

FOREIGN PATENT DOCUMENTS

| | | |
|---|---|---|
| EP | 1542378 A1 | 6/2005 |
| EP | 1542387 A1 | 6/2005 |
| EP | 1628498 A2 | 2/2006 |
| EP | 1699197 A1 | 9/2006 |
| EP | 1919097 A1 | 5/2008 |
| JP | 2001127675 A | 5/2001 |
| JP | 2004129082 A | 4/2004 |
| JP | 2005520362 A | 7/2005 |
| JP | 2006211651 A | 8/2006 |
| JP | 2007096960 A | 4/2007 |
| JP | 2007110529 A | 4/2007 |
| JP | 2008092380 A | 4/2008 |
| JP | 2008104193 A | 5/2008 |
| JP | 2008136199 A | 6/2008 |
| JP | 2008236431 A | 10/2008 |
| JP | 2012501585 A | 1/2012 |
| KR | 100659725 B1 | 12/2006 |
| WO | 03005725 A2 | 1/2003 |
| WO | 2007050861 A2 | 5/2007 |
| WO | 2007102506 A1 | 9/2007 |
| WO | WO2008012672 | 1/2008 |
| WO | 2008021396 A2 | 2/2008 |
| WO | 2008036633 A2 | 3/2008 |
| WO | 2008095543 A1 | 8/2008 |
| WO | 2008111809 A2 | 9/2008 |
| WO | 2010027647 A1 | 3/2010 |
| WO | 2010042235 | 4/2010 |

OTHER PUBLICATIONS

Congchong Ru et al: "UEP Video Transmission Based on Dynamic Resource Allocation in MIMO OFDM System" IEEE Wireless Communications and Networking Conference, 2007, WCNC 2007, Mar. 11-15, 2007, Hong Kong, IEEE Operations Center, Piscataway, NJ, Mar. 1, 2007, pp. 310-315, XP031097201 ISBN: 978-1-4244-0658-6 Section I.

International Search Report & Written Opinion—PCT/US09/030230, International Search Authority—European Patent Office—Sep. 4, 2009.

International Search Report & Written Opinion—PCT/US09/030231, International Search Authority—European Patent Office—Aug. 6, 2009.

Razi A., et al.,"Feedback Reduction Schemes for MIMO Broadcast Channels," Personal, Indoor and Mobile Radio Communications, 2008, PIMRC 2008, IEEE 19th International Symposium, pp. 1-5, Sep. 15-18, 2008.

Taiwan Search Report—TW098100378—TIPO—May 14, 2013.

* cited by examiner

METHOD AND APPARATUS FOR CHANNEL FEEDBACK BY MULTIPLE DESCRIPTION CODING IN A WIRELESS COMMUNICATION SYSTEM

CLAIM OF PRIORITY UNDER 35 U.S.C. §119

The present Application for Patent claims priority to Provisional Application No. 61/104,465 entitled "Method and Apparatus for Channel Feedback in a Wireless Communication System" filed Oct. 10, 2008, assigned to the assignee hereof and hereby expressly incorporated by reference herein.

REFERENCE TO CO-PENDING APPLICATIONS FOR PATENT

The present Application for Patent is related to co-pending U.S. patent application Ser. No. 12/348,837 entitled "Method and Apparatus for Channel Feedback by Multiple Description Coding in a Wireless Communication System," filed Jan. 5, 2009, assigned to the assignee hereof and hereby expressly incorporated by reference herein.

FIELD OF INVENTION

The exemplary and non-limiting aspects described herein relate generally to wireless communications systems, methods, computer program products and devices, and more specifically to techniques for improved channel quality feedback in a coordinated multi-point (CoMP) communication network.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with providing higher order spatial channel feedback from user equipment (UE) to base nodes so that improved interference nulling can be achieved through beamforming. In particular, as cooperative transmissions are exploited, such as coordinated multi-point (CoMP) communications, UEs can significantly contribute to system performance improvement by providing such feedback.

In one aspect, a method is provided for wirelessly transmitting feedback by measuring a wireless channel, reducing quantization error of feedback reports by encoding the feedback as multiple description coding, and transmitting the feedback.

In another aspect, at least one processor is provided for wirelessly transmitting feedback. A first module measures a wireless channel. A second module reduces quantization error of feedback reports by encoding the feedback as multiple description coding. A third module transmits the feedback.

In an additional aspect, a computer program is provided for wirelessly transmitting feedback. A computer-readable storage medium comprises a first set of codes for causing a computer to measure a wireless channel. A second set of codes causes the computer to reduce quantization error of feedback reports by encoding the feedback as multiple description coding. A third set of codes causes the computer to transmit the feedback.

In another additional aspect, an apparatus is provided for wirelessly transmitting feedback. Means are provided for measuring a wireless channel. Means are provided for reducing quantization error of feedback reports by encoding the feedback as multiple description coding. Means are provided for transmitting the feedback.

In a further aspect, an apparatus is provided for wirelessly transmitting feedback. A receiver measures a wireless channel. A computing platform reduces quantization error of feedback reports by encoding the feedback as multiple description coding. A transmitter transmits the feedback.

In yet one aspect, a method is provided for wirelessly receiving feedback by receiving a plurality of feedback reports, decoding multiple description coding of the feedback reports over a plurality of transmission intervals, determining a coherent channel across the plurality of transmission intervals, and combining a plurality of feedback reports for increased feedback accuracy for a coherent channel across transmission intervals.

In yet another aspect, at least one processor is provided for wirelessly receiving feedback. A first module receives a plurality of feedback reports. A second module decodes multiple description coding of the feedback reports over a plurality of transmission intervals. A third module determines a coherent channel across the plurality of transmission intervals. A fourth module combines a plurality of feedback reports for increased feedback accuracy for a coherent channel across transmission intervals.

In yet an additional aspect, a computer program product is provided for wirelessly receiving feedback. A computer-readable storage medium comprises a first set of codes for causing a computer to receive a plurality of feedback reports. A second set of codes causes the computer to decode multiple description coding of the feedback reports over a plurality of transmission intervals. A third set of codes causes the computer to determine a coherent channel across the plurality of transmission intervals. A fourth set of codes causes the computer to combine a plurality of feedback reports for increased feedback accuracy for a coherent channel across transmission intervals.

In yet another additional aspect, an apparatus is provided for wirelessly receiving feedback. Means are provided for receiving a plurality of feedback reports. Means are provided for decoding multiple description coding of the feedback reports over a plurality of transmission intervals. Means are provided for determining a coherent channel across the plurality of transmission intervals. Means are provided for combining a plurality of feedback reports for increased feedback accuracy for a coherent channel across transmission intervals.

In yet a further aspect, an apparatus is provided for wirelessly receiving feedback. A receiver receives a plurality of feedback reports. A computing platform determines a coherent channel across the plurality of transmission intervals and decodes multiple description coding of the feedback reports over a plurality of transmission intervals. The computing platform combines a plurality of feedback reports for increased feedback accuracy for a coherent channel across transmission intervals.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
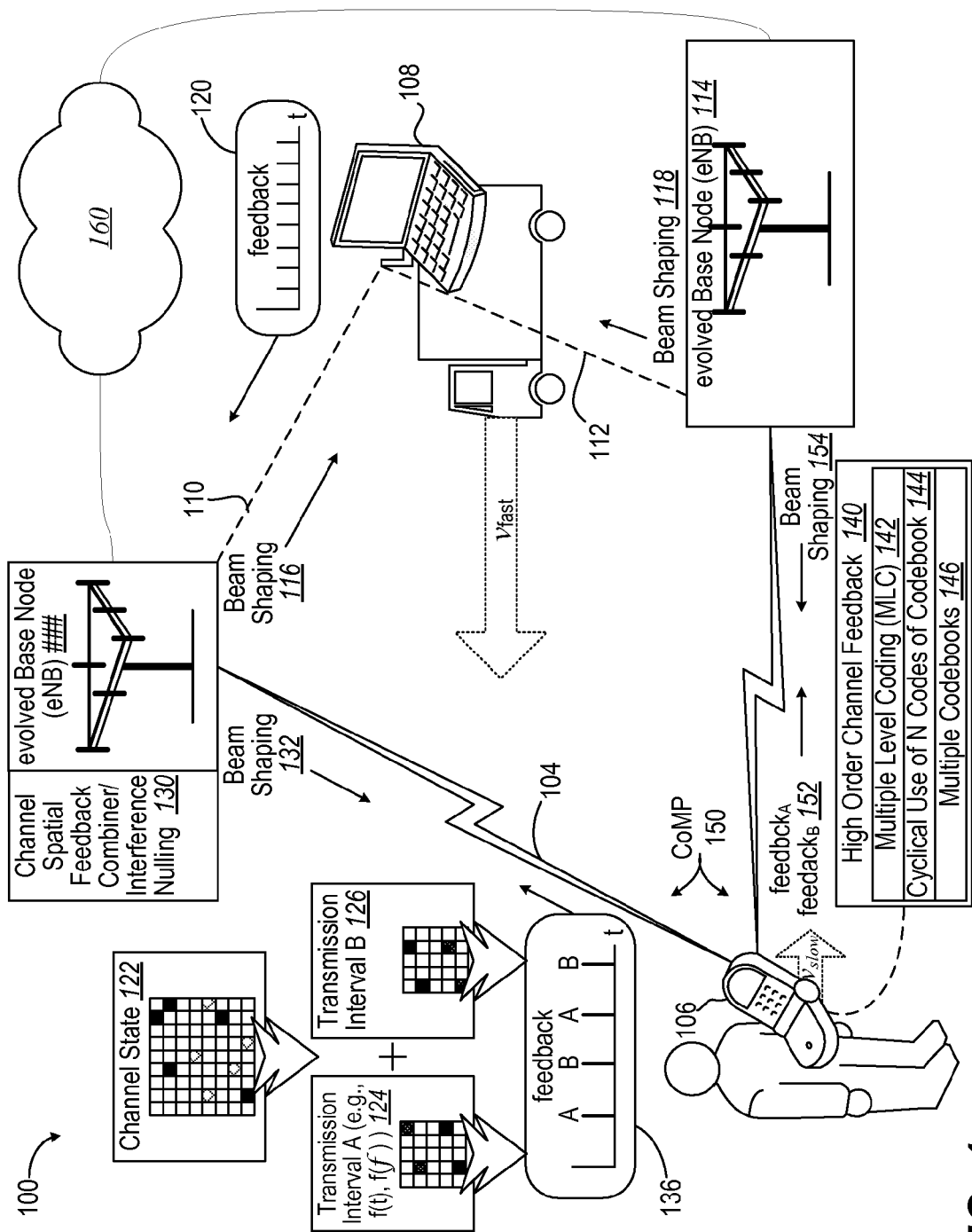
FIG. 1 depicts a block diagram of a communication system of a network utilizing a plurality of evolved Base Nodes (eNBs) for coordinated multi-point (CoMP) communication to a low mobility user equipment (UE) that transmits adaptive data rate and payload feedback of channel state for increased downlink interference nulling.

In an illustrative context for the present innovation, spatial feedback from user equipment (UE) can be used to reflect channel direction information (CDI) or precoding matrix index (PMI) of various nodes or generally feedback that is quantized. Advantageously, high-rate feedback can be used to provide spatial processing gains for low mobility users. Accordingly to analysis, gains of spatial cooperation for pedestrian UEs (e.g., 1-3 km/h) can be realized. Such gains cannot be made relying upon message-based (L3) feedback. In a particular exemplary use, there is a need to address spatial codebook design with higher accuracy requirements (e.g., CoMP) compared to the case of multiple input multiple output (MIMO) precoding. Traditional approach to precoding feedback design does not scale well as accuracy requirements increase. By contrast, feedback delivery and scheduling delays limit performance for a high mobility UE (e.g., greater than 10 km/h velocity); thus gains through spatial processing are limited for low mobility UEs regardless of feedback accuracy. In particular, for low mobility UEs, channel coherence across subsequent CDI or PMI reports can be exploited.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, a communication system 100 of a base station, depicted as an evolved base node (eNB) 102, communicates via an over-the-air (OTA) link 104 with user equipment (UE), depicted as a low mobility (e.g., pedestrian-carried) UE 106 and a higher mobility (e.g., vehicle-carried) UE 108. The higher mobility UE 108 can be engaged in a conventional multiple input multiple output (MIMO) communication session depicted at 110 with the eNB 102 as well as another session 112 with an eNB 114. In order that the eNBs 102, 114 can effectively perform beam shaping depicted respectively at 116, 118 to minimize interference to another UE 106, the UE 108 transmits channel feedback 120. Due to rapid change in location of the higher mobility UE 108, this feedback 120 can have a minimal delay. Thus, in order to not consume OTA resources and processing capability, each spatial feedback transmission is advantageously small in resolution.

By contrast, the low mobility UE 106 has an opportunity advantageously to transmit higher order spatial channel feedback in order that better interference nulling can be achieved. It should be appreciated that UE 106 can be capable of performing legacy MIMO transmission such as described for UE 108. In addition, the UE 106 can be responsive to its degree of mobility to enter into a higher order spatial channel feedback mode when appropriate.

For coherent interference that varies little over a particular period of time or over a particular portion of frequency spectra being used (e.g., transmission intervals of time or frequency respectively), the low mobility UE 106 can advantageously send a higher resolution feedback message 122 for the channel state. In order to not adversely impact the OTA capacity, advantageously this feedback 122 can be transmitted in feedback A and feedback B portions 124, 126, perhaps even at a slower transmission rate as depicted at 128 than the higher mobility UE 108. These portions of available channel state feedback are combined for enhanced interference nulling by a channel spatial feedback combiner 130 of the eNB 102 for performing enhanced interference nulling depicted as beam shaping 132.

In order to break up this feedback into smaller portions, in an aspect discussed in the aforementioned co-pending application, the UE 106 can advantageously use one or more of a high order channel feedback component 140. In particular, Multiple Level Coding (MLC) component 142 provides for sending a base feedback layer with subsequent enhancement layers. Alternatively or in addition, rather than using the best matching code from a single codebook, a group of N best codes can be cyclically or randomly selected as depicted at 144 so that a situation is avoided where the same low resolution code is repeatedly sent. Alternatively or in addition, multiple codebooks can be used sequentially in order to provide different information, enabling the eNB 102 to work with each code individually or to build up a higher order channel state understanding by combining the codes.

Thereby, the low mobility UE 106 can engage more effectively in forms of communication that can benefit from enhanced interference nulling, such as network MIMO as depicted at 150 where feedback A, B 152 is also transmitted to eNB 110, which responds in turn with beam shaping as depicted at 154. In an exemplary use, multiple description coding and channel state feedback in network MIMO are used by UE 106 with a network 160 enabling coordination between eNB 102, 114.

Advantageously, in using an exemplary MDC approach at both UEs 106, 108 in which a different code is selected based upon a transmission interval, the UEs 106, 108 need not necessarily change feedback transmission rate or inform the eNBs 102, 110 of such a change. Instead, the eNBs 102, 110 can determine that a coherent channel across the transmission interval is indicated by the multiple feedback reports, providing an opportunity for combining feedback reports for a more accurate representation of the channel feedback with less quantization error. Alternatively or in addition, the UEs 106, 108 can adjust their transmission interval based upon a determined degree of mobility as depicted.

Downlink coordinated multi-point (CoMP) framework implies cooperative transmission from multiple network nodes (access points, cells or eNBs) to user equipment (UE) or multiple UEs so that inter-node interference is minimized and/or channel gain from multiple nodes is combined at UE receiver. Such cooperative gain and particularly cooperative interference nulling rely upon availability of accurate channel state information at the transmitter (CSIT) of every cooperating node. CSIT feedback is provided in the existing WWAN (Wireless Wide Area Network) air interfaces (e.g. UMB, LTE, WiMax) in a form of precoding direction. Specifically a codebook of precoding vectors (in the case of single spatial stream transmission) and precoding matrices (in the case of single or multi-user MIMO transmission) is used. Each element of the codebook (vector or matrix) corresponds to the 'best' beam (set of beams) corresponding to the downlink channel and UE feeds back index of the best entry based on downlink channel measurements. Typically, precoding feedback is limited to 4-6 bits which is adequate for the existing WWAN systems wherein feedback is optimized for single user (possibly MIMO) transmission and potentially intranode space division multiple access (SDMA). However, such a design proves to be insufficient in the context of inter-node cooperation for the following reasons.

Figure 2:
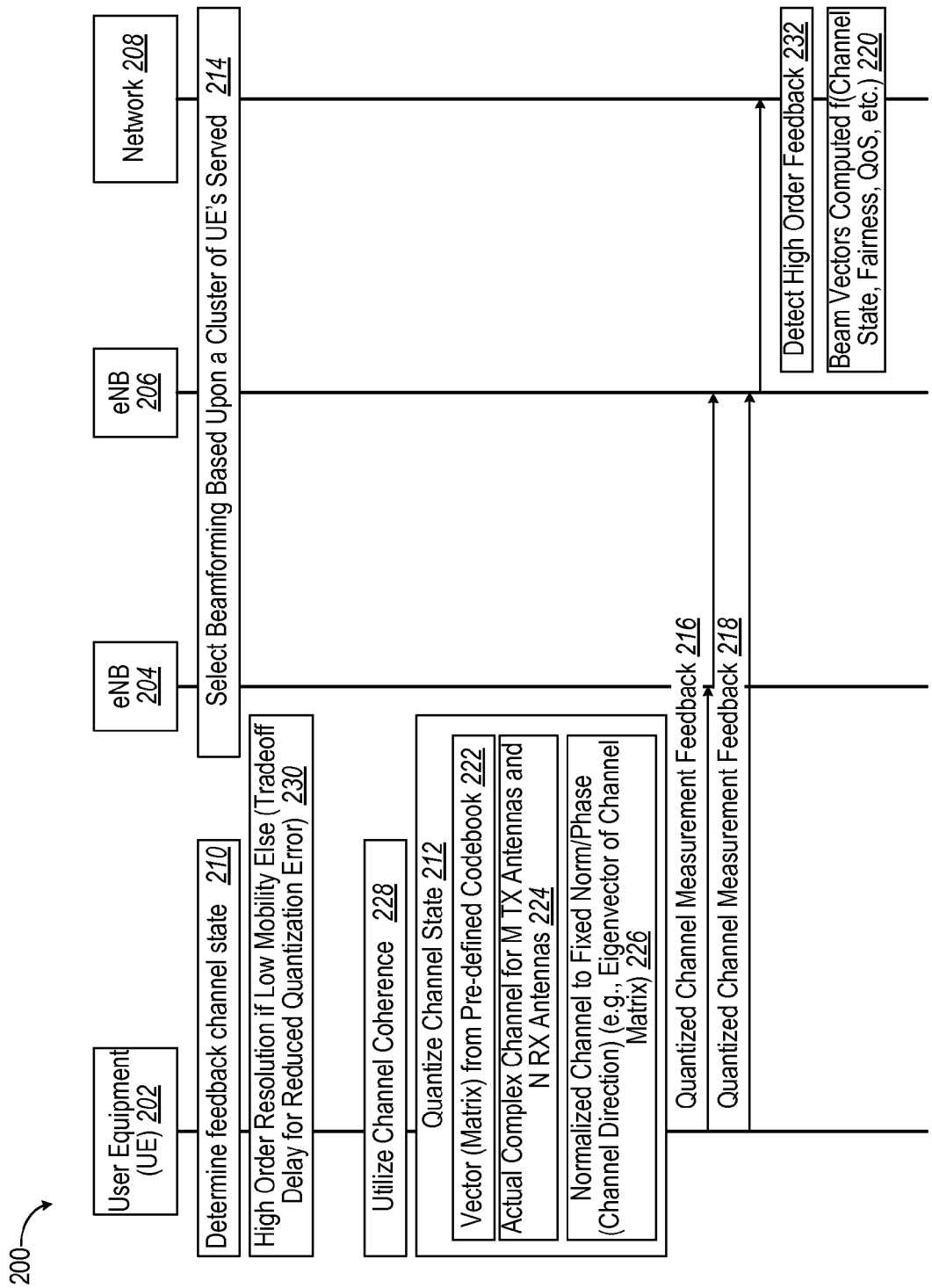
FIG. 2 depicts a timing diagram of a methodology for high order spatial channel feedback.

In FIG. 2, in one aspect a methodology 200 is provided for high order spatial channel feedback from a UE 202 that is used by a plurality of eNBs 204, 206 used by a network 208 for cooperative transmissions (e.g., CoMP). In block 210, UE 202 determines feedback channel state rather than preferred beam direction since the network can be in a better position to determine optimal beam shaping as well as reducing a computational burden on the UE 202. The UE quantizes the feedback (block 212). In an illustrative aspect, the network 208 uses the eNBs 204, 206 for cooperative CoMP communication (block 214). CoMP efficiency relies on the ability of a group of cooperating nodes (cluster) to adaptively choose a set of UEs to be cooperatively served on a given time-frequency resource based on channel conditions of these UEs as well as long or short term fairness criterion, QoS etc. Note that the appropriate choice of beams depends on the set of UEs served. Since a UE does not have information about conditions/requirements of other UEs, a UE cannot determine the right set of beam vectors. Meanwhile as depicted at 216, 218, UEs can feed back a (quantized version of) the channel measurement to various cooperating nodes 204, 206 so that appropriate beam vectors can be computed at the network side based on UE feedback as well as other considerations (e.g. fairness, QoS, etc) (block 220). Hence, in the context of CoMP, feeding back a (quantized) channel rather than the proposed beam direction seems to be more appropriate. Similarly to the existing feedback scheme, vector (matrix) quantization can be used so that UE feeds back index of a vector (matrix) from a pre-defined codebook that matches channel measurement best (block 222). Note that such a feedback may be in the form of the actual complex channel from multiple transmit antennas of one or more nodes to one or multiple receive antennas of the UE (block 224); it can also be in a form where e.g. channel normalized to a fixed norm and phase of any element of its vector (so-called 'channel direction'), principal eigenvector of the channel matrix in the case of multiple receive antennas, etc. (block 226)

In quantizing channel state information, the UE advantageously makes use of channel coherence to improve feedback accuracy at the network side (block 228). CoMP requires higher feedback accuracy compared to the single user beamforming/MIMO which are the main objectives of the existing WWAN designs. Specifically, feedback needs to be accurate enough to enable interference nulling by a cooperative node or set of nodes. A simple analysis shows that e.g. 6-bit feedback design in a system with 4 transmit antennas and Gaussian IID (independent and identically distributed) channels yields average interference nulling gain on the order of 6 dB only and every additional bit improves the achievable interference nulling by about 1 dB. Hence a design that aims at 10 dB nulling gain would require 10 bits per feedback report which is roughly double of what is currently used. Unlike the existing systems where only feedback relative to a single serving node is needed, in CoMP feedback of the channels between the UE and all cooperative nodes is needed. This fact further drives the overall feedback rate requirements.

It is, however, important to note that high interference nulling gains can be achieved only for UEs with relatively low mobility. Indeed, medium to high UE mobility on one hand and delay between the time of channel measurement and feedback calculation at UE and the actual downlink transmission by cooperating nodes (referred to as scheduling delay) on the other hand limit achievable nulling gain. This is depicted as determination by the UE at block 230 and recognition of the network 208 at block 232 that a high order channel state feedback is being used. A high resolution (low quantization error) feedback from medium-high mobility UEs is therefore less valuable since channel variations caused by scheduling delay limit nulling gains. The key observation here is that high channel feedback accuracy is needed for UEs with relatively low mobility only. Hence it is natural to think of exploiting channel coherence across time to improve feedback accuracy for a given resolution (number of bits per report) on the UE feedback. In the following sections, we highlight a few techniques that achieve this goal.

Figure 3:
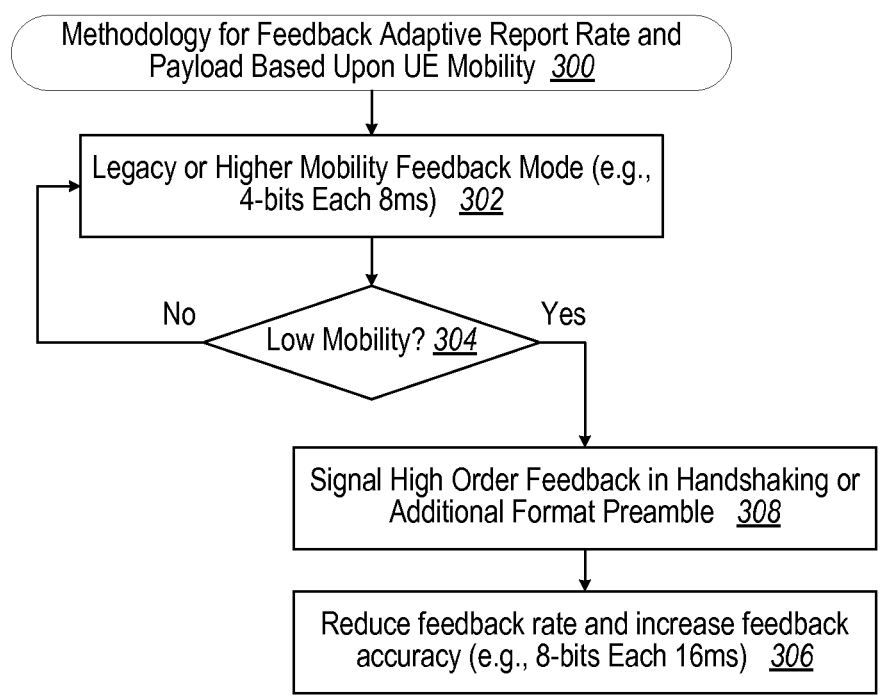
FIG. 3 depicts a flow diagram of a methodology for adaptive feedback rate and payload.

In FIG. 3, a methodology 300 is depicted that advantageously uses adaptive report rate and payload, leveraging an observation that that low mobility UEs do not need to feed back channel state as often as high mobility UEs one hand, depicted as an initial state in block 302, but low mobility UEs warrant higher feedback accuracy (i.e., to make sure that the latter is not the limiting factor for the achievable nulling gain) on the other hand. Hence a simple approach would consist of slowing down feedback and increasing payload for lower mobility UEs. Thus, in block 304, the UE determines that it is in a low mobility state. In response, the UE reduces feedback rate and increases feedback payload (block 306). As a specific example, assume that uplink overhead considerations yield 4-bit feedback every 8 ms, which is equivalent to a 0.5 kbps feedback channel. In this case, one could consider a design where UEs with high(er) mobility feedback a 4-bit report every 8 ms while low(er) mobility UEs feedback 8-bit report every 16 ms. The obvious drawbacks of this approach are (a) a need to tune report format to UE mobility which implies either explicit communication (handshake) between the UE and the network or additional bits to indicate the format (block 308) as well as impacts due to (b) increased feedback delay (8 ms to 16 ms) that limits nulling gains.

Alternatively, the network can recognize the low mobility of the UE and can anticipate receiving high order feedback without additional handshaking or signaling. As a further alternative, in some implementations the UE can increase feedback accuracy in a low mobility state without necessarily reducing the feedback rate in proportion or at all.

Figure 4:
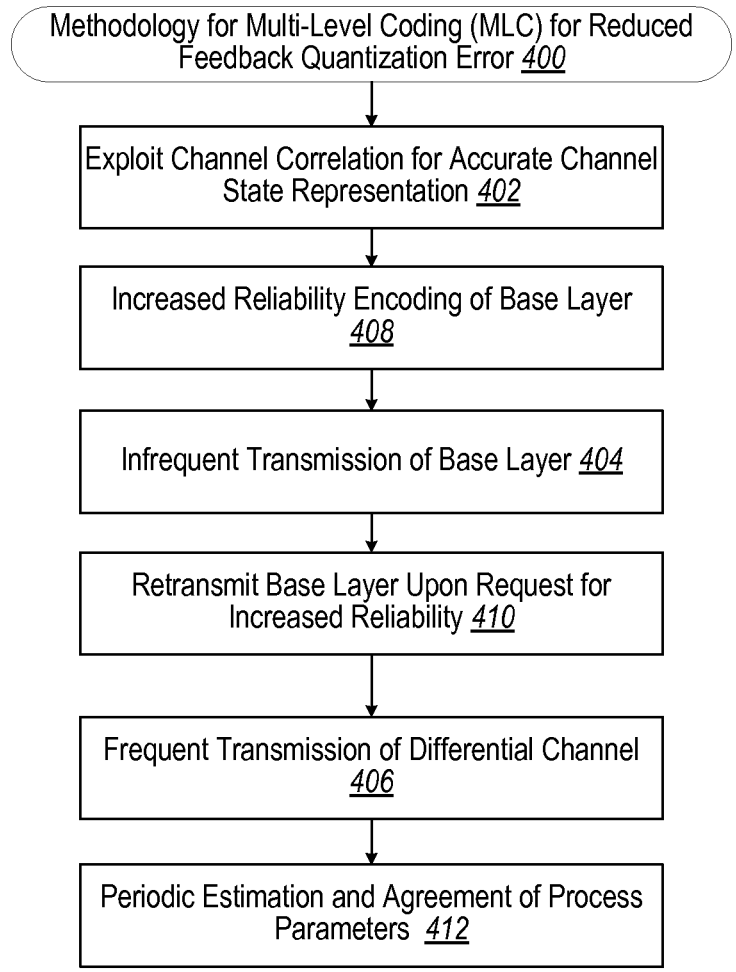
FIG. 4 depicts a flow diagram of an alternative methodology for adaptive feedback rate and payload based upon multi-level coding (MLC).

In FIG. 4, an alternative approach to achieving high order feedback (e.g., reduced quantization errors) is depicted as a methodology 400 for Multi-Level Coding (MLC). Multi-level coding principle is widely used in source coding, namely speech, audio and video coding. The basic idea of multi-level coding is to exploit channel correlation to achieve the most accurate representation for a given payload size (block 402). Practically speaking, multi-level coding implies periodic infrequent feedback of the full quantized channel (usually called base layer) (block 404) and more frequent feedback of 'differential channel' or 'innovation' (block 406). The higher channel correlation across time the better feedback accuracy can be achieved with a given number of bits. Multi-level coding arguably provides the best accuracy for a given payload size. There is however a number of drawbacks to this approach. First of all, base layer needs to be sent with higher reliability than enhancement layer as the loss of base layer means loss of feedback until base layer is retransmitted (block 408). This also implies that base layer should be transmitted fairly often and/or explicit signaling is needed from the network to UE to request retransmission of the base layer (block 410). Second, multi-level coding gain depends on the accuracy of process modeling (i.e. approximation of channel correlation across time). Hence process parameters need to be periodically estimated and agreed upon between the UE and the network, depicted at 412. Finally, implementing multi-level coding implies multiple changes to the feedback structure at PHY/MAC level as well as additional signaling to communicate feedback format, (correlation) parameters etc.

Figure 5:
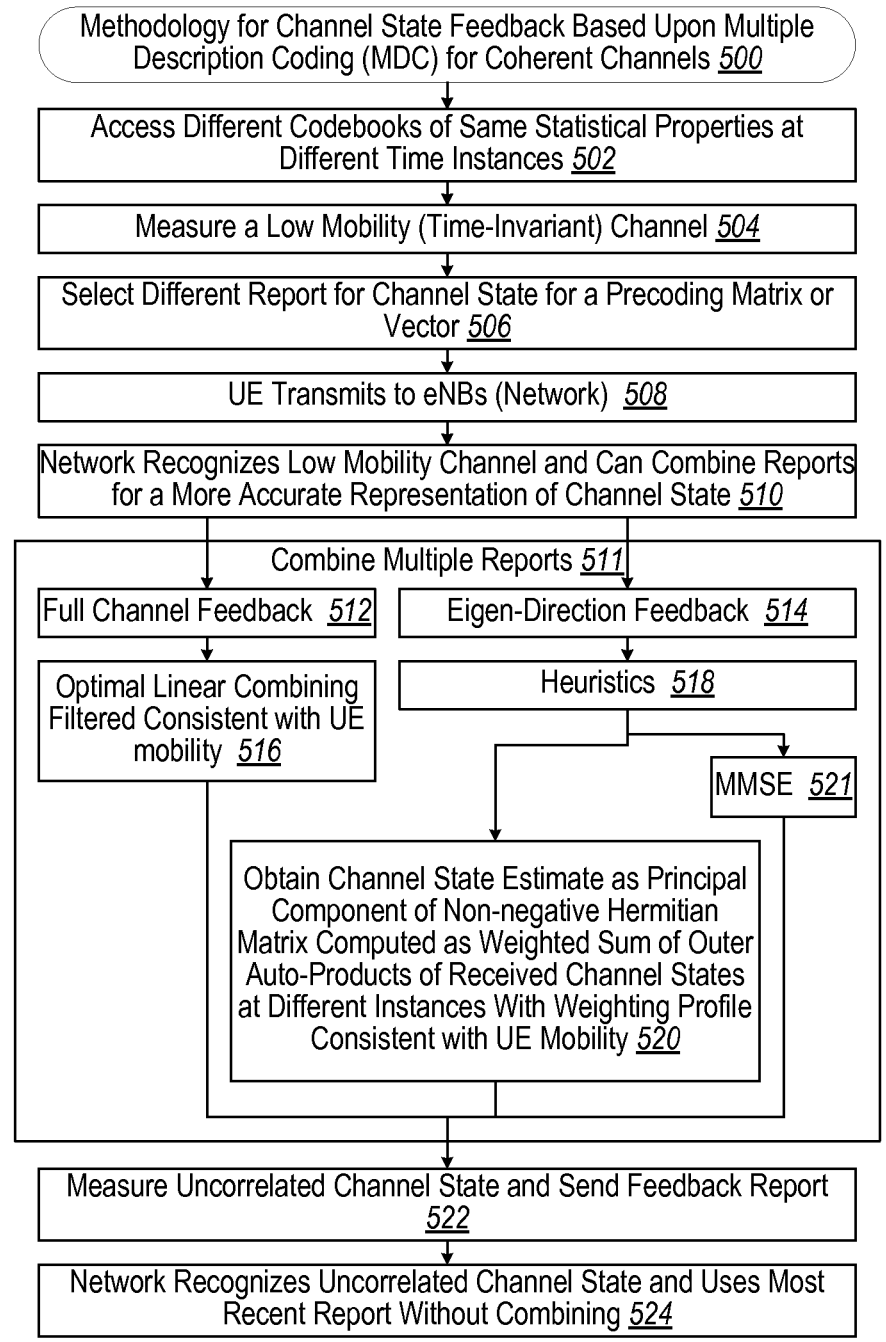
FIG. 5 depicts a flow diagram of another alternative methodology for adaptive feedback rate and payload based upon multiple description coding (MDC) using multiple codebooks.

In FIG. 5, an exemplary alternative for increased feedback accuracy is depicted as a methodology 500 for Multiple Description Coding (MDC). The general idea of multiple description coding consists of using multiple code descriptions to improve the accuracy of the source representation at the receiver. In the present context of channel state feedback, this could be implemented by e.g. using different codebooks with the same statistical properties at different time instances (block 502). To illustrate this concept, let's assume a static or low mobility (time-invariant) channel (block 504). In the existing WWAN systems, constant (time invariant) codebook is used hence UE would feed exactly the same preceding index to the network at every time instance assuming accurate channel state estimation at the receiver. Hence multiple consecutive feedback reports do not provide and additional information and channel state estimation at the network is defined by quantization accuracy (payload) size of a single feedback instance. Now assume that a time varying codebook is used. In the latter case, every instance of channel feedback refers to an entry from a different codebook hence yielding a different precoding matrix or vector (block 506). Instead of obtaining exactly the same information regarding channel state on different reports (as in fixed codebook case), the network gets different 'looks' at the channel state (block 508). Based on the network assessment of low UE mobility (block 510), the network may choose to suitably combine these reports to improve the accuracy of channel state as compared to a single report from a fixed codebook (block 511).

Various specific ways of how to combine multiple reports may be considered depending on the type of channel state feedback. The two 'typical' examples are full channel feedback (block 512) and Eigen-direction feedback (block 514). In the former case, optimal combining may be achieved through linear (e.g., minimum means squared error (MMSE)) filtering of channel state feedback corresponding to different instances with the proper choice of filter parameters consistent with UE mobility, assuming that channel state is a Gaussian process (block 516). In the case of Eigen-direction feedback, optimal solution is not straightforward but some heuristics can be used (block 518). For instance, channel state estimate can be obtained as the principal component of a non-negative Hermitian matrix computed as a weighted sum of outer auto-products of channel states received at different instances with the proper choice of weighting profile consistent with UE mobility (block 520). Alternatively, the combination can be performed by MMSE (block 521).

Now let us consider a mobile UE such that channel state is fully uncorrelated between the adjacent reports (block 522). While the same time-varying codebook can be used, the network will use the most recent report from the UE to estimate channel state (block 524). Since every codebook in the time varying sequence has the same statistical properties as a fixed codebook, channel state feedback accuracy with a time-varying codebooks will be no different compared to the case of a fixed codebook. Hence the same sequence of codebooks can be used regardless of UE mobility.

Based on the above facts and further obvious observations, we can summarize some useful properties of multiple description coding (MDC) based on time-varying codebook design:

First, time varying codebook does not depend on UE mobility and channel variation statistics. Hence a single sequence of codebooks can be used to replace a single codebook. The length of this sequence is defined by the maximum number of reports considered for combining. As increase in combining gain reduces along with the number of combined reports even at relatively low mobility, practical sequence length can be limited to single digit or low double digit numbers. Once sequence length is fixed, this sequence can be re-used (e.g., in a round robin fashion).

Second, for a 'sensible' UE implementation, no additional complexity at the UE is incurred due to time varying codebook compared to a fixed one. Indeed, UE computes preceding feedback for a given codebook based on the best match of channel estimate across all entries of the codebook. In the case of time invariant codebook, matching is performed with respect to the same codebook while in the case of time varying codebook matching with respect to different codebooks is performed at different time instances. Note that memory requirements will not be large if time varying sequence has limited size while performance gain even with 2-4 codebooks turns to be substantial. Also note that fairly good codebooks can be generated in a pseudo-random fashion (based on a pre-determined low-complexity algorithm seeded by a number) in which case there would be no additional memory requirements and there is no need/reason to limit sequence length to a small number.

Third, combining of multiple reports is optional at the network. As explained before in the case of time varying channel, the network can use the most recent report only from the UE thereby achieving the same feedback accuracy as the standard fixed codebook design. A 'lazy' network implementation would use the most recent report regardless of UE mobility and hence will achieve performance/complexity tradeoff that is achievable with a fixed codebook. Meanwhile, a 'smart' network implementation could combine multiple reports based on UE mobility estimated at the network.

Fourth, every instance of feedback can have the same format and reliability requirements yielding a homogeneous control signaling (PHY/MAC) design. In the context of 3GPP LTE evolution (LTE-Advanced), it may be possible to reuse the existing UE feedback format defined in LTE Rel-8 based on PUCCH. Furthermore, as already mentioned, codebook structure does not depend on UE mobility hence there is no need for additional periodic signaling between the UE and the network to synch-up on feedback format and parameters (unlike in the case of adaptive report rate/payload or multi-level coding).

Note that multiple description coding principle can be applied in the case of a fixed codebook as well. Instead of feeding back the index of the best matching precoding entry, a low mobility UE could feed back in a round-robin fashion its N best entries. Performance gain of this solution remains non-negligible for low-mobility UEs so long N is relatively small although it is certainly less than performance gain obtained when the best preceding entry is reported at every instance and a time varying codebook is used. Another clear drawback of this approach is that N needs to be updated according to UE channel conditions since using N>1 is clearly detrimental for high mobility UEs where no combining is possible. Updating N means additional signaling between the UE and the network which is also undesirable.

Figure 6:
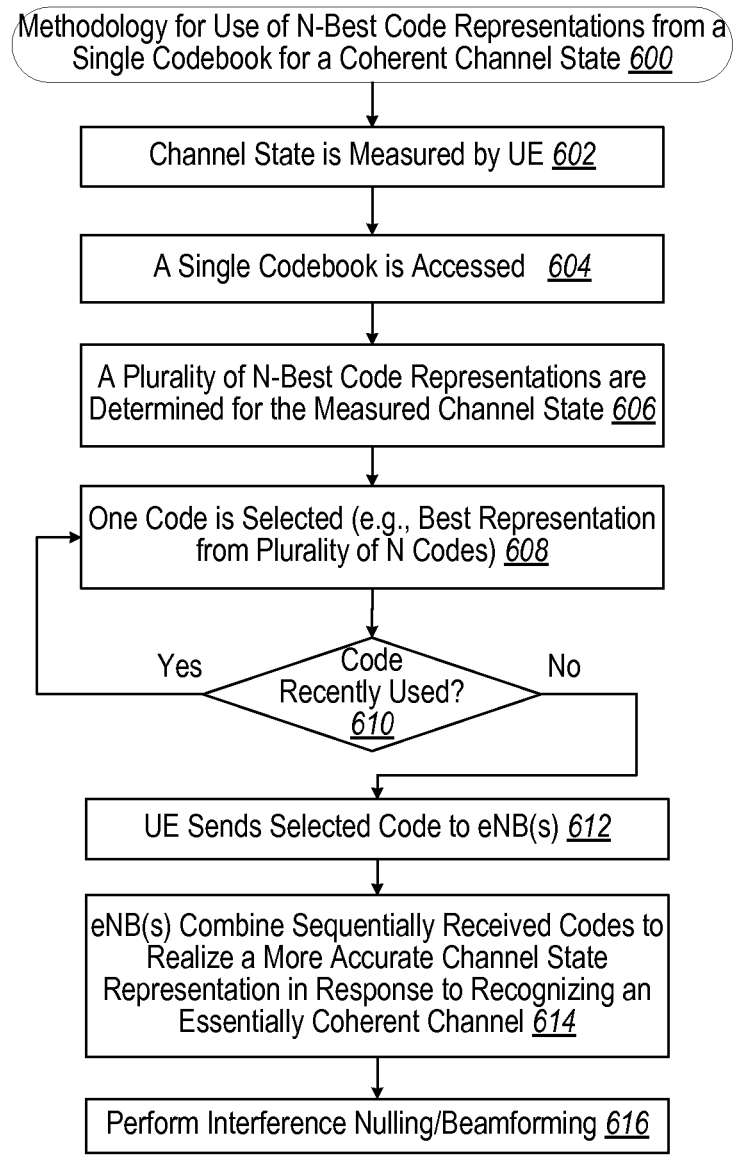
FIG. 6 depicts a flow diagram of an additional alternative methodology for MDC based upon a fixed codebook.

Thus, in FIG. 6, as a further alternative for increased feedback accuracy, a methodology 600 is depicted wherein a single codebook is used. In particular, it is recognized that the best representation from the codebook can be repetitively sent if the channel state is coherent. Thus, the network gains no additional insight into the channel state by such repetitively sent feedback. For a codebook of sufficient size, a plurality of N representations can be selected as a group that are the "best" and randomly or cyclically sent such that the network can combine these representations to realize a more accurate representation of the channel state. To that end, in block 602, the UE measures the channel state. A codebook is accessed (block 604) and a plurality of N representation codes are selected as most closely approximating the channel state (block 606). One of the codes is selected (e.g., rank ordered as best, randomly selected, sequentially selected) (block 608) A determination is made as to whether this was the code sent during the late feedback transmission (block 610). If so, processing returns to block 608 to select another code. If appropriate in block 610, then the selected code is sent (block 612). At the network, the series of codes are recognized as being directed to an essentially coherent channel, enabling a combination of the code representations to achieve a more accurate representation (block 614). Based upon this determination, improved interference nulling can be performed by appropriate cooperative beamforming (block 616).

Figure 7:
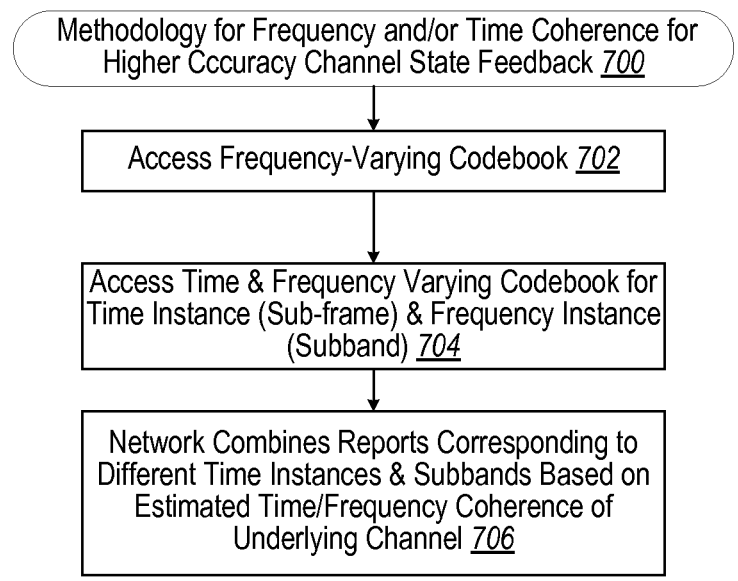
FIG. 7 depicts a flow diagram of a further alternative methodology for adaptive feedback rate and payload for both time and frequency varying codebooks.

Returning to observations regarding multiple description coding, fifth, the described multiple description coding principle can be applied in the context of frequency coherence as well. In FIG. 7, a methodology 700 is depicted for taking advantage of frequency coherence for higher accuracy in channel state feedback. By using frequency varying codebook (e.g. different codebooks corresponding to different sub bands) (block 702), we can improve channel state accuracy for channels with a good coherence in the frequency domain, hence moderate frequency selectivity. In a more general setting, one should consider time and frequency varying codebook design where channel state quantization within a given time instance (e.g. sub-frame) and a given sub band is performed according to a codebook associated with this slot/sub band pair (block 704). The network can further combine reports corresponding to different time instances and sub bands based on the estimated time/frequency coherence of the underlying channel (block 706).

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 8:
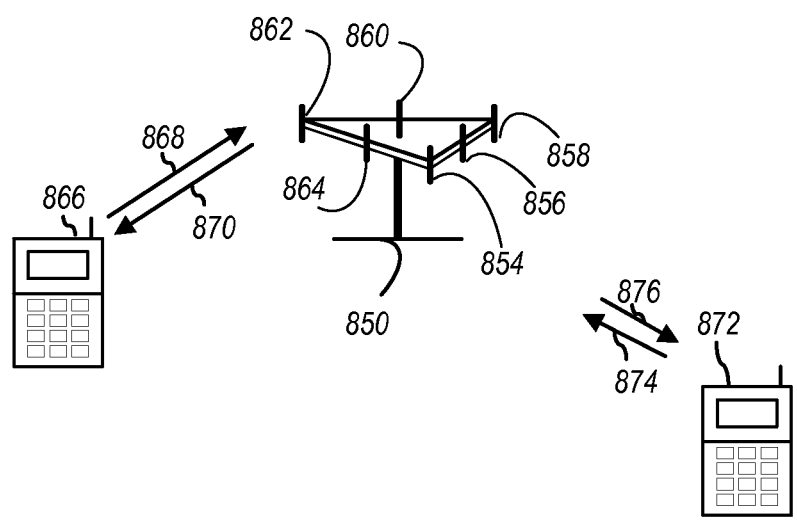
FIG. 8 depicts a multiple access wireless communication system according to one aspect.
Figure 9:
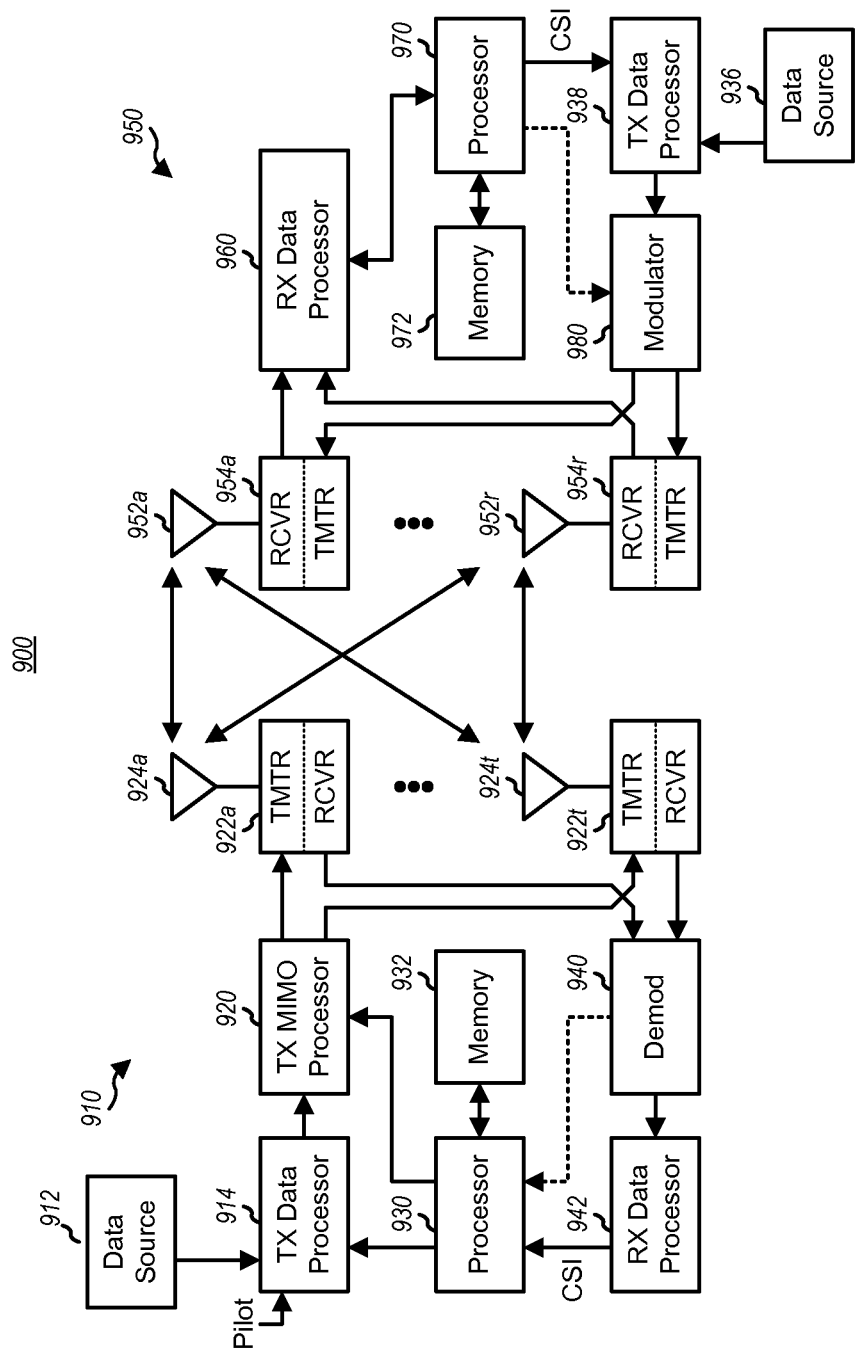
FIG. 9 depicts a block diagram of a communication system.

Referring to FIG. 8, a multiple access wireless communication system according to one aspect is illustrated. An access point 850 (AP) includes multiple antenna groups, one including 854 and 856, another including 858 and 860, and an additional including 862 and 864. In FIG. 8, only two antennas are shown for each antenna group, however, more or fewer antennas may be utilized for each antenna group. Access terminal (AT) 866 is in communication with antennas 862 and 864, where antennas 862 and 864 transmit information to access terminal 866 over forward link 870 and receive information from access terminal 866 over reverse link 868. Access terminal 872 is in communication with antennas 856 and 858, where antennas 856 and 858 transmit information to access terminal 872 over forward link 876 and receive information from access terminal 872 over reverse link 874. In a FDD system, communication links 868, 870, 874 and 876 may use different frequency for communication. For example, forward link 870 may use a different frequency then that used by reverse link 868. Each group of antennas and/or the area in which they are designed to communicate is often referred to as a sector of the access point 850. In the aspect, antenna groups each are designed to communicate to access terminals 866, 872 in a sector of the areas covered by access point 850.

In communication over forward links 870 and 876, the transmitting antennas of access point 850 utilize beamforming in order to improve the signal-to-noise ratio of forward links for the different access terminals 866 and 874. Also, an access point using beamforming to transmit to access terminals scattered randomly through its coverage causes less interference to access terminals in neighboring cells than an access point transmitting through a single antenna to all its access terminals.

An access point 850 may be a fixed station used for communicating with the terminals and may also be referred to as an access point, a Node B, or some other terminology. An access terminal 866, 872 may also be called user equipment (UE), a wireless communication device, terminal, access terminal or some other terminology.

FIG. 5 is a block diagram of an aspect of a transmitter system 910 (also known as the access point) and a receiver system 950 (also known as access terminal) in a MIMO system 900. At the transmitter system 910, traffic data for a number of data streams is provided from a data source 912 to a transmit (TX) data processor 914.

In an aspect, each data stream is transmitted over a respective transmit antenna. TX data processor 914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 930.

The modulation symbols for all data streams are then provided to a TX MIMO processor 920, which may further process the modulation symbols (e.g., for OFDM). TX MIMO processor 920 then provides $N_T$ modulation symbol streams to $N_T$ transmitters (TMTR) 922a through 922t. In certain implementations, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 922a through 922t are then transmitted from $N_T$ antennas 924a through 924t, respectively.

At receiver system 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective received signal, digitizes the conditioned signal to provide samples, and further processes the samples to provide a corresponding "received" symbol stream.

An RX data processor 960 then receives and processes the $N_R$ received symbol streams from $N_R$ receivers 954 based on a particular receiver processing technique to provide $N_T$ "detected" symbol streams. The RX data processor 960 then demodulates, deinterleaves, and decodes each detected symbol stream to recover the traffic data for the data stream. The processing by RX data processor 960 is complementary to that performed by TX MIMO processor 920 and TX data processor 914 at transmitter system 910.

A processor 970 periodically determines which pre-coding matrix to use (discussed below). Processor 970 formulates a reverse link message comprising a matrix index portion and a rank value portion.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by transmitters 954a through 954r, and transmitted back to transmitter system 910.

At transmitter system 910, the modulated signals from receiver system 950 are received by antennas 924, conditioned by receivers 922, demodulated by a demodulator 940, and processed by a RX data processor 942 to extract the reserve link message transmitted by the receiver system 950. Processor 930 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

In an aspect, a channel structure is provided that preserves low PAR (at any given time, the channel is contiguous or uniformly spaced in frequency) properties of a single carrier waveform.

Figure 10:
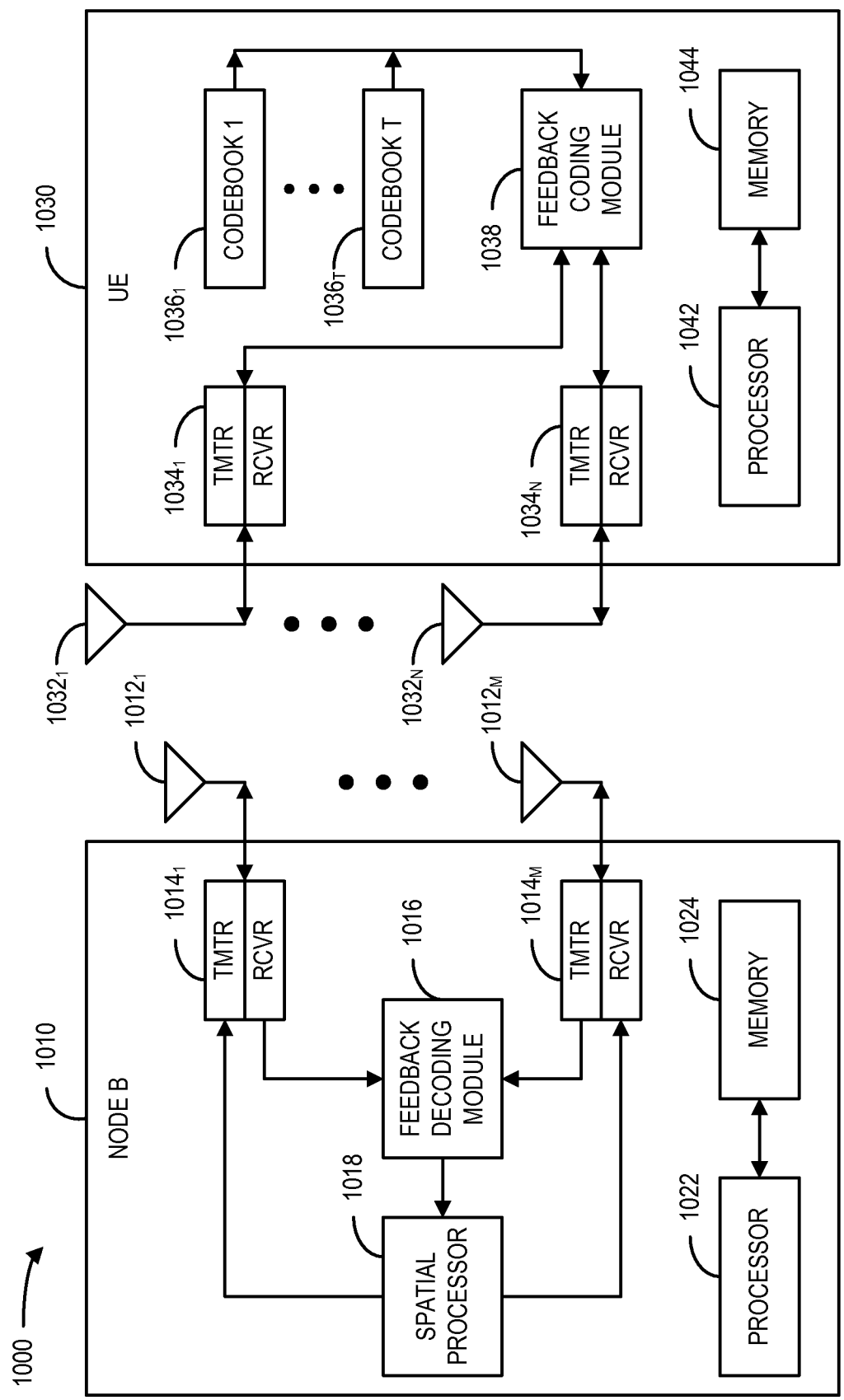
FIG. 10 depicts a block diagram of a system for generating and processing channel information feedback in a wireless communication system.

For the purposes of the present document, the following abbreviations apply:

AIS Automatic Identification System
AM Acknowledged Mode
AMD Acknowledged Mode Data
ARQ Automatic Repeat Request
BCCH Broadcast Control CHannel
BCH Broadcast CHannel
C– Control–
CCCH Common Control CHannel
CCH Control CHannel
CCTrCH Coded Composite Transport Channel
CDI Channel Direction Information
CP Cyclic Prefix CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
i.i.d. independent and identically distributed
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MIMO Multiple Input Multiple Output
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
QoS Quality of Service
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U– User–
UE User Equipment
UL UpLink
UM Unacknowledged Mode
UMB Ultra Mobile Broadband
UMD Unacknowledged Mode Data
UMTS Universal Mobile Telecommunications System
UTRA UMTS Terrestrial Radio Access
UTRAN UMTS Terrestrial Radio Access Network
WWAN Wireless Wide Area Network Turning to FIG. 10, a block diagram of a system 1000 for generating and processing channel information feedback in a wireless communication system is illustrated. System 1000 can include one or more Node Bs 1010 and one or more UEs 1030, which can communicate via respective antennas 1012 and 1032. In one example, UE 1030 can provide spatial feedback to Node B 1010, which can be utilized by Node B 1010 to ascertain CDI of various network nodes and perform spatial processing. Alternatively, preceding matrix index (PMI) can be the form of feedback. CDI represents the actual channel (or a normalized channel) between the network (eNB) and the UE while PMI represents a precoder (beam) suggested by the UE to the eNB based on channel measurements performed as the UE.

In one aspect, UE 1030 can include a feedback coding module 1038, which can generate and/or otherwise identify channel state information (e.g., spatial feedback information) for transmission to Node B 1010. In one example, feedback coding module 1038 can utilize multiple description coding to encode spatial feedback information as described herein to generate a series of streams for spatial feedback that can be communicated from transceiver(s) 1034 and antenna(s) 1032 to Node B 1010. For example, feedback coding module 1038 can utilize a set of codebooks 1036 to encode respective streams. In an aspect, codebooks 1036 can be configured with substantially similar properties and can be configured to vary in time, frequency, and/or any other suitable interval. Spatial feedback streams can then be received at Node B 1010 via antenna(s) 1012 and transceiver(s) 1014. Upon receipt of the spatial feedback at Node B 1010, a feedback decoding module 1016 and/or a spatial processor 1018 can be utilized to obtain a channel estimate corresponding to UE 1030, based on which transmissions to UE 1030 can be adjusted. By utilizing multiple description coding in the described manner, it can be appreciated that the interference suppression performance of system 1000 can be increased without requiring an increase in spatial codebook size.

In another aspect, multiple description coding as described herein can be performed in a manner that is transparent to UE 1030 without requiring changes in the processing and/or reporting rules utilized by UE 1030. In one example, feedback decoding module 1016 and/or spatial processor 1018 at Node B 1010 can extrapolate spatial feedback information corresponding to a UE 1030 from past reports from the UE 1030 in order to compress errors.

As FIG. 10 illustrates, Node B 1010 can additionally utilize a processor 1022 and/or memory 1024 to implement the above functionality and/or other suitable functionality. Similarly, UE 1030 can include a processor 1042 and/or a memory 1044 that can be utilized to implement the above functionality and/or other suitable functionality.

Figure 11:
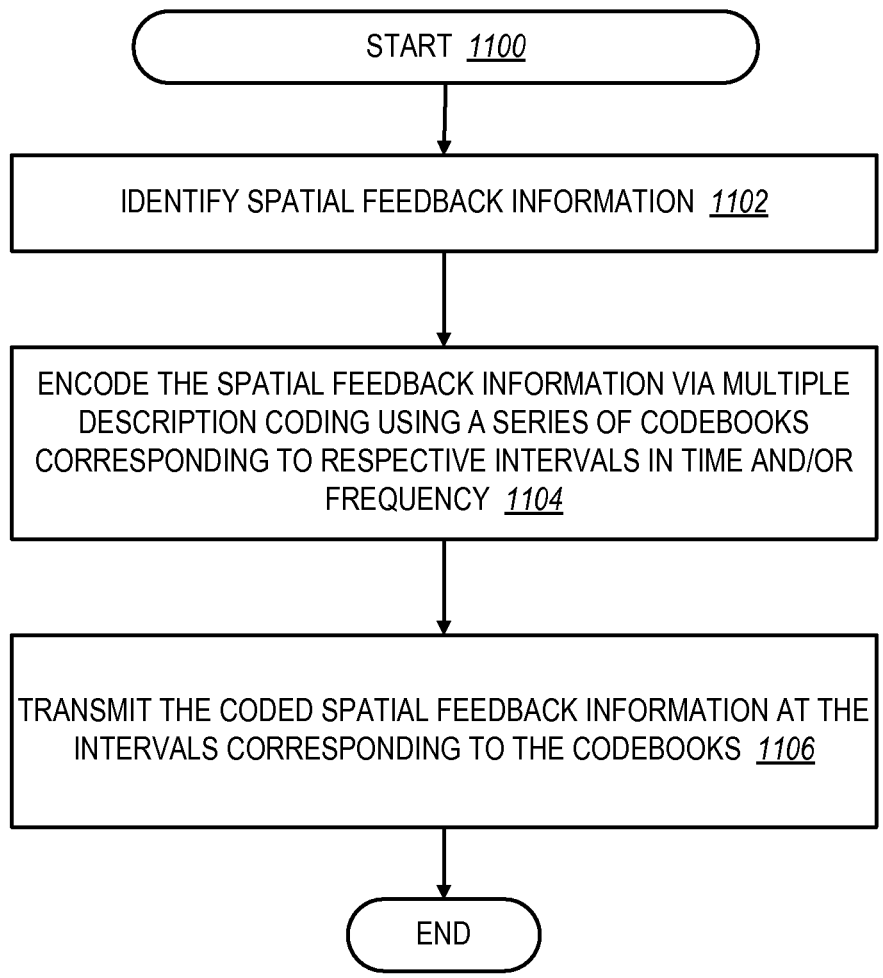
FIG. 11 depicts a flow diagram of a methodology for coding and communicating channel feedback.

FIG. 11 illustrates a methodology 1100 for coding and communicating channel feedback. At block 1102, spatial feedback information is identified. At block 1104, the spatial feedback information is encoded via multiple description coding using a series of codebooks corresponding to respective intervals in time and/or frequency. At block 1106, the coded spatial feedback information is transmitted at the intervals corresponding to the codebooks.

Figure 12:
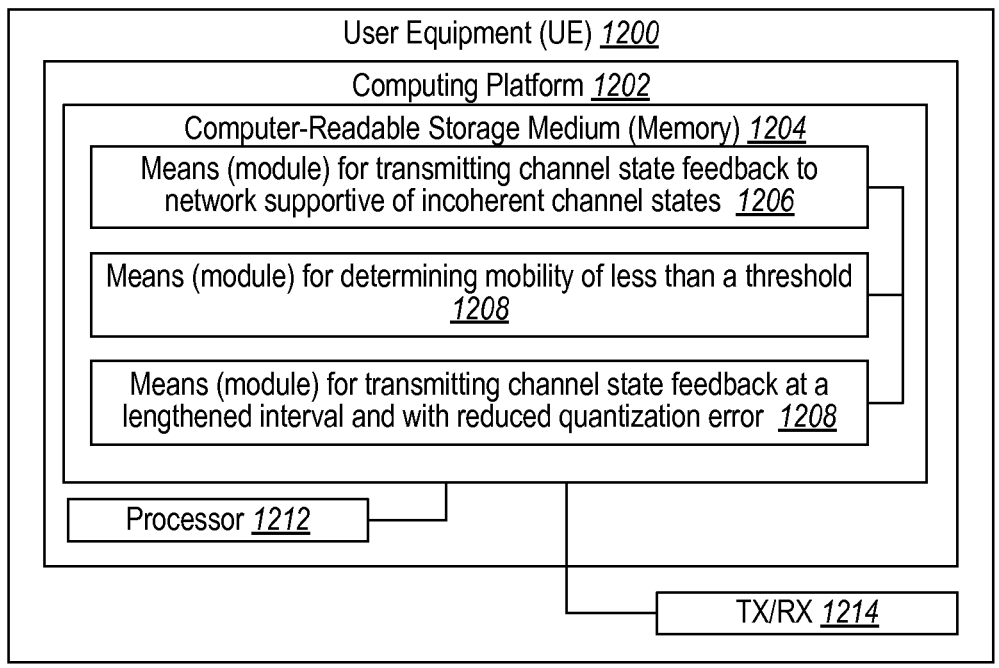
FIG. 12 depicts a block diagram of a computing platform of UE that supports means for performing adaptive feedback rate and payload.
Figure 13:
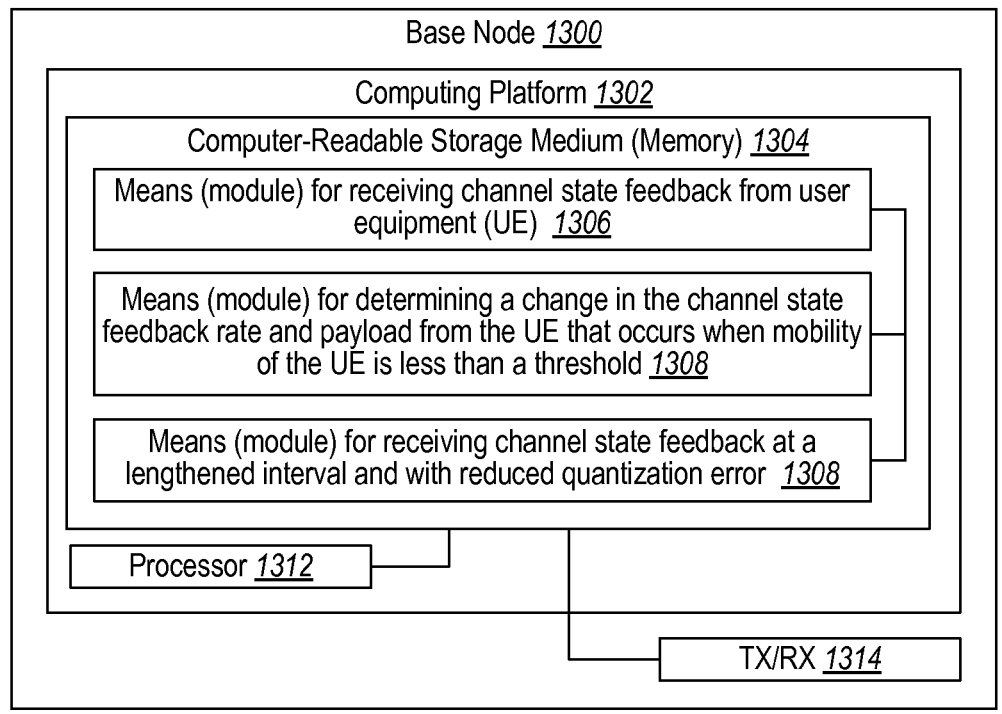
FIG. 13 depicts a block diagram of a computing platform of a base node that supports means for receiving adaptive feedback rate and payload.

In FIG. 12, user equipment (UE) 1200 has a computing platform 1202 that provides means such as sets of codes for causing a computer to perform adaptive feedback rate and payload for more accurate channel state information at the transmitter. In particular, the computing platform 1202 includes a computer readable storage medium (e.g., memory) 1204 that stores a plurality of modules 1206-1210 executed by a processor(s) 1212, which also controls a transmitter/receiver component 1214 for communicating with eNBs (FIG. 13). In particular, a means (module) 1206 is provided for transmitting channel state feedback to a network in a manner supportive of incoherent channel states. A means (module) 1208 is provided for determining mobility of less than a threshold (i.e., a low mobility state that warrants increasing feedback accuracy perhaps with reduced frequency of transmission). A means (module) 1210 is provided for transmitting channel state feedback at a lengthened interval and with reduced quantization error.

In FIG. 13, evolved base node (eNB) 1300 has a computing platform 1302 that provides means such as sets of codes for causing a computer to receive and use adaptive feedback rate and payload for more accurate channel state information at the transmitter. In particular, the computing platform 1302 includes a computer readable storage medium (e.g., memory) 1304 that stores a plurality of modules 1306-1310 executed by a processor(s) 1312, which also controls a transmitter/receiver component 1314 for communicating with UE (FIG. 12). In particular, a means (module) 1306 is provided for receiving channel state feedback from user equipment (UE). A means (module) 1308 is provided for determining a change in the channel state feedback rate and payload from the UE that occurs when mobility of the UE is less than a threshold. A means (module) 1310 is provided for receiving channel state feedback at a lengthened interval and with reduced quantization error.

With regard to codebook performance metric, assume frequency flat channel between $M_{TX}$ TX (transmit) antennas & one RX (receiving) antenna. Consider extensions to frequency selective channels via channel expansion in a suitable basis, quantization of the expansion coefficients and subsequent reconstruction. Suitable basis could be quantization of "flat" channels from different sub-bands, time domain (tap) quantization, etc. Codebook performance can be defined in terms of the distribution tail of the maximum correlation of a channel with the best codeword. Thus, consider a codebook (C) defined $$C = [C_1, \ldots, C_{N_{CW}}] \| C_l \| = 1, \text{ where } 1 \le l \le N_{CW}$$

$$r_\alpha^2(C) = \arg_\mu \left\{ \mathbb{P}\left\{ \max_{1 \le l \le N_{CW}} |C_l^* h|^2 \le \|h\|^2 \right\} = \alpha \right\}$$

where Probability P is with respect to distribution of the $M_{TX} \times 1$ channel h, $C_l$ is the $M_{TX} \times 1$ codeword vector, the CDI payload (bits) is given by $N_{cw} = 2^{N_E}$. As a rationale, consider for a static channel h, a beamforming vector that is chosen orthogonal to the reported CDI guarantees interference suppression with probability not less than $(1-\alpha)$ of at least $$-10 \log_{10}(1 - r_\alpha^2(C)) [\text{dB}]$$

Thus, regarding codebook performance analysis, numerical analysis suggests that as codebook size increases a codebook chosen randomly consistent with the distribution of h is as good as a codebook chosen to maximize $r_\alpha^2(C)$.

Performance of a random codebook can be assessed analytically for a family of complex circular Gaussian channels. Consider only the case of i.i.d. (independent and identically distributed) channel h although extension to correlated channels is possible. Random codebook C is generated as a set of i.i.d. complex circular Gaussian channels normalized to a unit norm $$\mathbb{P}\left\{ \max_{1 \le l \le N_{CW}} |C_l^* h|^2 \le \mu \|h\|^2 \right\} = (1 - (1-\mu)^{M_{TX}-1})^{N_{CW}}$$

$$1 - r_\alpha^2(C) = (1 - \alpha^{2-N_B})^{\frac{1}{M_{TX}-1}}$$

Thus, a theoretical relationship can be shown between interference suppression $1 - r_\alpha^2(C)$ and probability $\alpha$.

Figure 14:
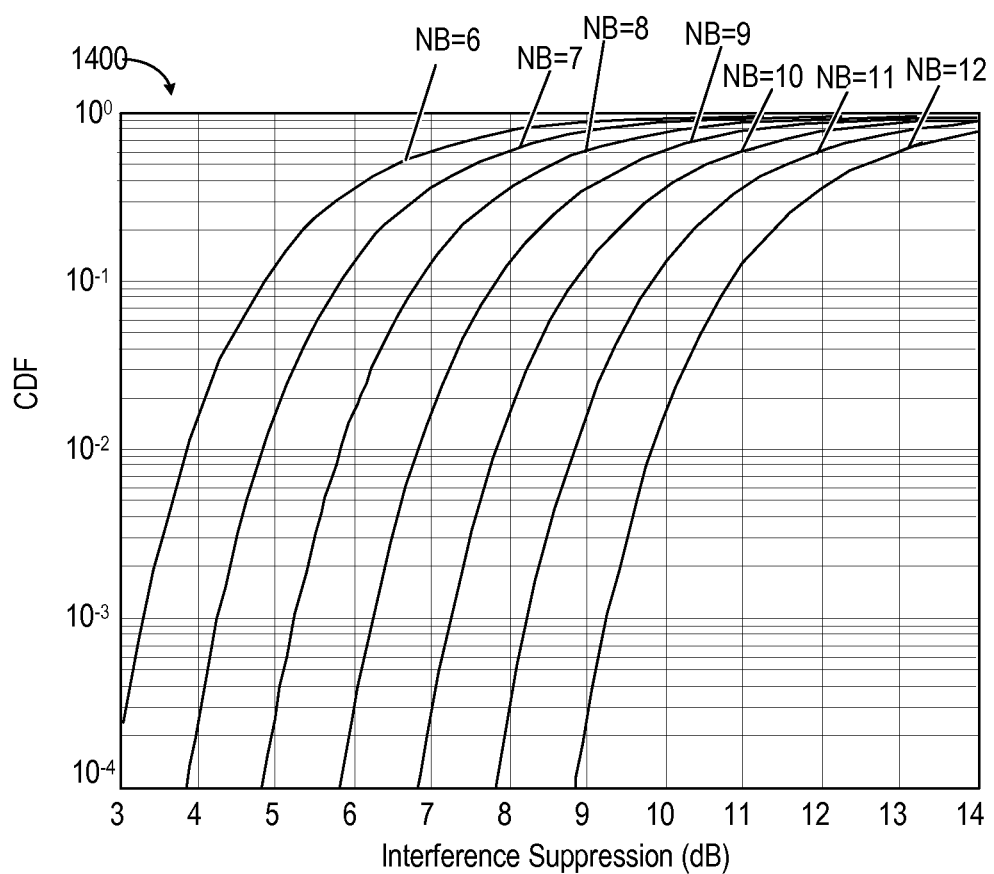
FIG. 14 depicts a plot of a simulation that each additional bit of channel state feedback improves interference suppression based on channel coherence.

Regarding, an empirical relationship based on optimized codebooks, select the best of $10^3$ randomly chosen codebooks, estimated $r_\alpha^2(C)$ based on $10^4$ random channels with results plotted as stars. Thereby, it can be observed that every additional bit improves suppression by 1 dB based on channel coherence as depicted at 1400 in FIG. 14.

Figure 15:
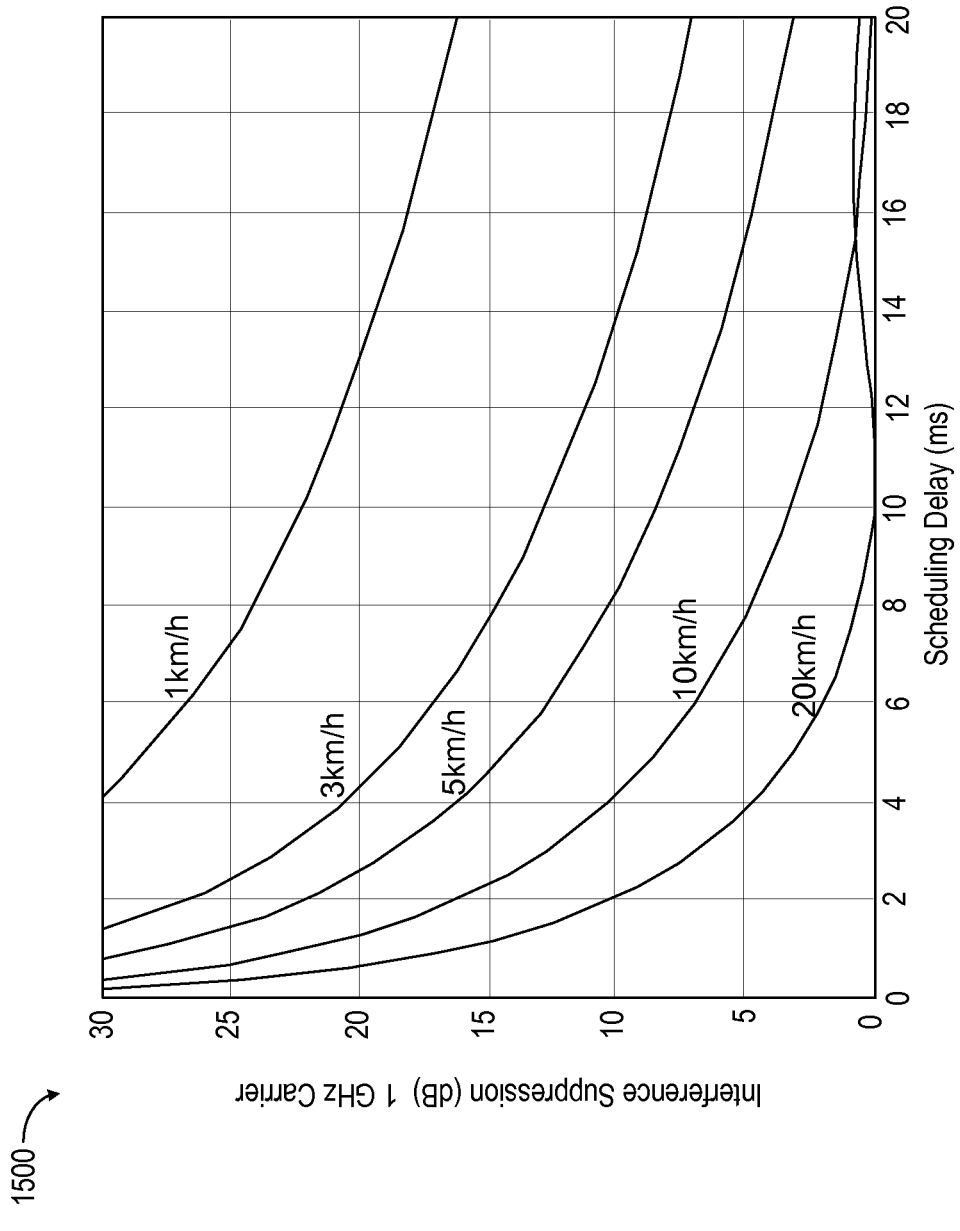
FIG. 15 depicts a plot of a simulation for moderate scheduling delay and a reasonable (L1) channel direction information (CDI) payload.

Further, assume ideal quantization and consider suppression level caused by channel de-correlation due to mobility. Focusing on low mobility (pedestrian) UEs and assume first order interpolation, better results are achievable with a reasonably matched higher-order model. As depicted in FIG. 15 at 1500, for pedestrian UEs, moderate scheduling delay and a reasonable (L1) CDI payload: channel feedback is a limiting factor, given velocity 1-3 km/h, scheduling delay≤10 ms, CDI payload≤12 bits.

As a high level approaches to the problem, one can tune reporting rate and payload size to channel variability. Update report format (resolution) can be adapted to UE mobility. In an exemplary approach, there can be a likely need to split payload over multiple reports due to higher erasure rate.

One option for achieving higher resolution, multi-level coding (MLC) can be used. MLC can require periodic reliable update of variation model parameters. There can be different reliability requirements for base and enhancement layers of the MLC. For instance, it can be of highest importance that a base layer is received in order to have meaningful information whereas a subsequent enhancement layer can be missed without serious degradation in achieving interference nulling based upon spatial feedback. One consideration for MLC is that higher complexity at UE can be required to generate the MLC spatial channel feedback.

As an alternative, multiple description coding (MDC) can be used. An exemplary implementation introduces multiple codebooks with the same properties for transmission interval (e.g., time-varying or frequency-varying) codebooks. Advantageously, such MDC implementation does not impose a change in processing or reporting rules at UE. Further, a "lazy eNB" can use instantaneous reports without having to combine MDC reports for a higher resolution spatial channel feedback, thus requiring no change with respect to a baseline. However, a "smart" eNB can extrapolate from past reports to compress errors.

As an illustrative analysis, consider a static channel case. Assume static flat channel between $M_{TX}$ TX antennas and one 1 RX antenna. Assume that T different codebooks $C^{(1)}, \ldots, C^{(T)}$ are used across T intervals and UE feeds back indices $1_1, \ldots, 1_N$. A plausible channel estimate to use is given by the dominant principal component of matrix $$\sum_{m=1}^{T} C_{l_m}^{(m)} C_{l_m}^{(m)*}$$

Figure 16:
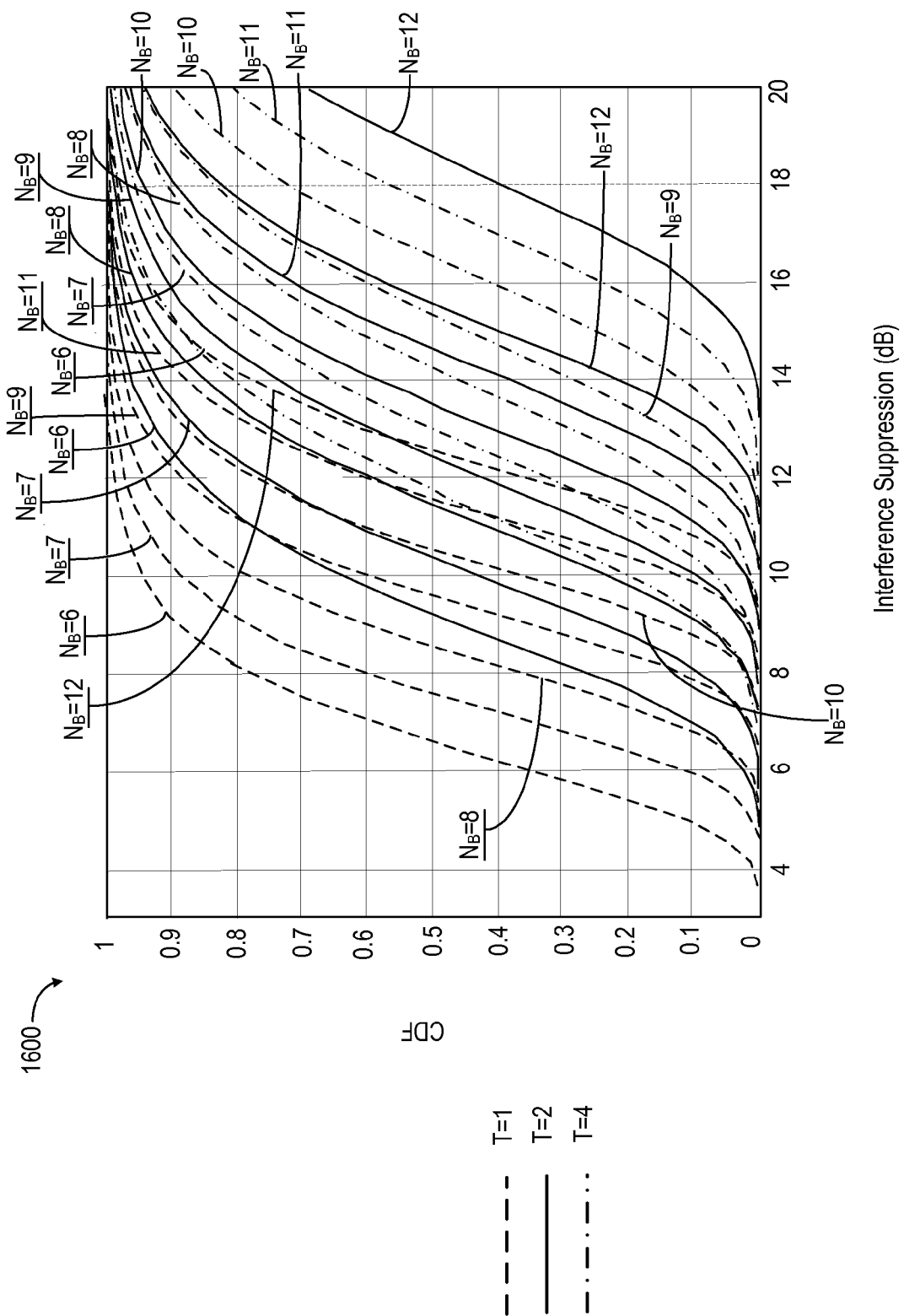
FIG. 16 depicts a plot of a simulation for averaging observations on a static channel.

On a static channel, it can be observed that averaging over 2 (4) observations is equivalent to adding approximately 3 (5) bits, as depicted in FIG. 16 at 1600.

With regard to analyzing time-selective channels, consider time variations according to Jakes model with different speeds. Time varying codebooks are assumed. As an extension of the combined estimator, search for the principal component of a matrix $$\sum_{m=1}^{T} |\rho m|^2 C_{l_m}^{(m)} C_{l_m}^{(m)*}$$

where $\rho_m$ is correlation between channels at the time of measurement and estimation: this weight proportional to the energy of the estimated component in the measured channel. Optimal solution is straightforward if the entire CSI, including CDI as well as envelope, is quantized as given by Wiener minimum means squared error (MMSE) filter. In the case of CDI only feedback, one can use the above mentioned ad-hoc solution given by the principal component of a weighted sum of outer products of the recent CDI reports. Furthermore, a suitable adaptation of the Wiener (MMSE) solution to the CDI only feedback case is also possible.

Several observations can be made in summary. Accounting for channel coherence across time is equivalent to a non-trivial increase in feedback payload size. The same applies to frequency domain variability as another form of a transmission interval. Potential solutions include adapting payload size and reporting rate to UE mobility, which can require explicit dynamic signaling to change reporting format. Alternatively, multi-level coding can be used, which can require explicit signaling and parameter tuning with non-uniform error protection. As yet another alternative, a plurality of nearly optimal codes can be used cyclically from the same codebook rather than continually sending the same code. As an exemplary alternative, multiple description coding via time (or frequency) varying codebooks can be used, which is transparent to UE, achieves gains based on eNB algorithm with no robustness issues as well as requiring minimal changes to AIS and UE implementation.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It should be appreciated for clarity that the illustrative aspects described herein focus on UE encoding spatial feedback to an eNB. However, applications consistent with aspects herein can be made to uplink (UL) traffic transmission with UL precoding (CoMP) wherein UE is forming beams based on feedback from the network (e.g., eNB). Thus, the roles of the UE and eNB change places with respect to increasing feedback accuracy.

It should be appreciated with the benefit of the present disclosure that MDC principles can be applied to any other type of feedback where quantized quantity exhibits correlation in time and/or frequency. As a specific example, we should use CQI reporting (which could be a broadband CQI and/or sub band specific CQI). Conventionally, a CQI would be quantized with a fixed table wherein every value of the payload would map to a certain C/I or rate (spectral efficiency) value. Instead, we could use time-varying tables thereby achieving MDC gains in a low mobility.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for wirelessly transmitting feedback, comprising:
   measuring a wireless channel to generate invariant feedback reports;
   reducing quantization error of the feedback reports by encoding each invariant feedback report with multiple description coding by differently encoding each invariant feedback report; and
   combining and transmitting the invariant feedback reports when mobility is determined to be less than a threshold.

2. The method of claim 1, further comprising:
   encoding the invariant feedback reports using a plurality of codebooks that correspond to and vary with respective transmission intervals; and
   transmitting the encoded invariant feedback reports at the respective transmission intervals.

3. The method of claim 2, wherein the transmission intervals are time intervals.

4. The method of claim 2, wherein the transmission intervals are frequency intervals.

5. The method of claim 2, wherein the transmission intervals are both time-based frames and frequency sub bands.

6. The method of claim 1, further comprising sending sequentially one of a plurality of best code representations from a single codebook.

7. The method of claim 1, further comprising identifying channel direction information (CDI) feedback.

8. The method of claim 7, further comprising measuring feedback normalized to a fixed norm and phase of any element of its vector to determine CDI.

9. The method of claim 8, further comprising measuring feedback as a principal eigenvector of a channel matrix for multiple receive antennas.

10. The method of claim 1, further comprising measuring channel quality indication (CQI) feedback.

11. The method of claim 1, further comprising measuring precoding matrix index (PMI) feedback.

12. The method of claim 1, further comprising transmitting channel state feedback.

13. At least one processor for wirelessly transmitting feedback, comprising:
   a first module for measuring a wireless channel to generate invariant feedback reports;
   a second module for reducing quantization error of the invariant feedback reports by encoding each invariant feedback report with multiple description coding by differently encoding each invariant feedback report; and
   a third module for combining and transmitting the invariant feedback reports when mobility is determined to be less than a threshold.

14. A computer program product for wirelessly transmitting feedback, comprising:
   a non-transitory computer-readable storage medium comprising,
   a first set of codes for causing a computer to measure a wireless channel to generate invariant feedback reports;
   a second set of codes for causing the computer to reduce quantization error of the invariant feedback reports by encoding each invariant feedback report with multiple description coding by differently encoding each invariant feedback report for the second set of codes; and
   a third set of codes for causing the computer to combine and transmit the invariant feedback reports when mobility is determined to be less than a threshold.

15. An apparatus for wirelessly transmitting feedback, comprising:
   means for measuring a wireless channel to generate invariant feedback reports;
   means for reducing quantization error of the invariant feedback reports by encoding each invariant feedback report with multiple description coding by differently encoding each invariant feedback report; and
   means for combining and transmitting the invariant feedback reports when mobility is determined to be less than a threshold.

16. An apparatus for wirelessly transmitting feedback, comprising:
   a receiver for measuring a wireless channel to generate invariant feedback reports;
   a computing platform for reducing quantization error of the invariant feedback reports by encoding each invariant feedback report with multiple description coding by differently encoding each invariant feedback report, and for combining the invariant feedback reports for transmission when mobility is determined to be less than a threshold; and
   a transmitter for transmitting the combined invariant feedback reports.

17. The apparatus of claim 16, wherein the computing platform is further for encoding the feedback using a plurality of codebooks that correspond to and vary with respective transmission intervals, and wherein the transmitter is further for transmitting the encoded feedback at the respective transmission intervals.

18. The apparatus of claim 17, wherein the transmission intervals are time intervals.

19. The apparatus of claim 17, wherein the transmission intervals are frequency intervals.

20. The apparatus of claim 17, wherein the transmission intervals are both time-based frames and frequency sub bands.

21. The apparatus of claim 16, wherein the computing platform is further for sequentially selecting each one of a plurality of best code representations from a single codebook.

22. The apparatus of claim 16, wherein the computing platform is further for identifying channel direction information (CDI) feedback.

23. The apparatus of claim 22, wherein the receiver and the computing platform are further for measuring feedback normalized to a fixed norm and phase of any element of its vector to determine CDI.

24. The apparatus of claim 23, wherein the receiver and the computing platform are further for measuring feedback as a principal eigenvector of a channel matrix for multiple receive antennas.

25. The apparatus of claim 16, wherein the receiver is further for measuring channel quality indication (CQI) feedback.

26. The apparatus of claim 16, wherein the receiver is further for measuring precoding matrix index (PMI) feedback.

27. The apparatus of claim 16, wherein the transmitter is further for transmitting channel state feedback.

* * * * *